United States Patent
Yang et al.

(10) Patent No.: US 6,470,231 B1
(45) Date of Patent: Oct. 22, 2002

(54) METHOD AND SYSTEM FOR AUTO DISPATCHING WAFER

(75) Inventors: Keng-Chia Yang, Chang-Hua; Yo Chang; Chen-Lung Chu, both of Hsin-Chu; Yi-Hung Lee, Yung-Ho, all of (TW)

(73) Assignee: Taiwan Semiconductor Manufacturing Co., Ltd. (TW)

( * ) Notice: Subject to any disclaimer, the term of this patent is extended or adjusted under 35 U.S.C. 154(b) by 0 days.

(21) Appl. No.: 09/557,086

(22) Filed: Apr. 21, 2000

(51) Int. Cl.$^7$ .............................................. G06F 19/00
(52) U.S. Cl. ...................................... 700/121; 700/100
(58) Field of Search ............................ 700/7, 8, 11–17, 700/95–97, 100–102, 117–121

(56) References Cited

U.S. PATENT DOCUMENTS

| | | | |
|---|---|---|---|
| 5,696,689 A | * 12/1997 | Okumura et al. | 700/121 |
| 5,818,716 A | * 10/1998 | Chin et al. | 700/100 |
| 5,928,389 A | * 7/1999 | Jevtic | 29/25.1 |
| 5,975,740 A | * 11/1999 | Lin et al. | 700/99 |
| 6,201,998 B1 | * 3/2001 | Lin et al. | 700/97 |
| 6,224,638 B1 | * 5/2001 | Jevtic | 29/25.1 |
| 6,336,204 B1 | * 1/2002 | Jevtic | 716/1 |
| 6,360,132 B2 | * 3/2002 | Lin et al. | 700/97 |

FOREIGN PATENT DOCUMENTS

| | | |
|---|---|---|
| EP | 810632 A2 | * 12/1997 |
| EP | 837494 A2 | * 4/1998 |
| JP | 10189687 A | * 7/1998 |
| JP | 2001319842 A | * 11/2001 |

* cited by examiner

Primary Examiner—Maria N. Von Buhr

(57) ABSTRACT

The invention is proposed to efficiently dispatch wafers into tools, and particularly to provide a real-time and automatic way to dispatch wafers. In addition, a method for dispatching wafers, a system for dispatching wafers into tools and a system for processing numerous lots by number of tools with automatic dispatch are present as examples. One main characteristic of the invention is that each pending wafer is given an individual priority before it is processed by any tool and the priority is automatically calculated in accordance with to a ranking algorithm. Another main characteristic of the invention is that whenever a tool is available to process at least one pending wafer, part of pending wafers is automatically assigned to the available tool in accordance with an assignment algorithm and a required limitation database that is provided by the dispatcher. In the ranking algorithm, each priority is a summation of following terms: Q-Time term, waiting status term, commit due date term, output term, hot run priority, idle term, super hot run term and exception rule term. Herein, these priorities are adjusted by some system variables that modified by dispatcher. In the lot assignment algorithm, each wafer is dispatched to an available tool in accordance with following restriction: scheduled output must be satisfied, output of each tool must be maximized and wafer with higher priority must be preferentially processed. Moreover, exigency of wafers includes super hot run, hot run and normal run, and each exigency corresponds to an individual dispatching flow.

67 Claims, 6 Drawing Sheets

METHOD AND SYSTEM FOR AUTO DISPATCHING WAFER

BACKGROUND OF THE INVENTION

1. Field of the Invention

The present invention relates to a dispatching system and a dispatching method, and is particularly relates to dispatching system and method that automatically dispatch wafers, or lots that includes several wafers with same product, into tools. Moreover, the invention provides operators an on-line dynamic dispatching and also provides dispatchers both a forecast dispatching list and an adjustable way to optimize dispatching result.

2. Description of the Prior Art

A typical method for manufacturing semiconductor integrated circuit devices may include more than hundred process steps, which are usually at least classified into following categories: photolithography, etching, implantation, diffusion, deposition and sputtering. Moreover, in a semiconductor manufacturing fabrication factory, not only various variety tools (machines) are used for these process steps but also number of each kind tool is numerous. Further, not only abundant wafers under processing but also different wafers usually correspond to different products. Therefore, numerous tools, various processes and abundant wafers must be properly managed, and then how to dispatch wafers, or lots that include several wafers with same output, into tools becomes a very important topic in handling manufacturing.

In practical factory, process steps are performed in sequence. It means that a succeeding process step is performed when preceding process steps are finished. Beside, same category of process steps are performed together for same tools are mutually required, even required materials and processes are different. Moreover, the basic dispatching rule is dispatching some pending wafers to be processed whenever some tools are available. However, owing to some facts such as one tool can be used to process wafers with different products, wafers with different products at least requires different materials, and required process times of different wafers are different. It is obvious that the basic dispatching rule is improperly and it is desired to develop an advanced is dispatch way to efficiently dispatch wafers.

In typical conventional dispatching method and system, wafers that preceding process steps are finished are stored in a lots bank and wait to be dispatched into various tools (machines). On the other hands, operators of tools process wafers by some tools that are available to process wafers. Further, except some pre-provided information about which wafer must be processed preferentially and which specific wafer must be processed by which specified tool, operators only rely on their experience and judgment to decide which wafer should be preferentially processed and which available tool is used to process wafers. As can be expected, the conventional method and system often causes inefficient use of these tools. Moreover, because operators mainly dispatch wafers by their experience, whenever wafers with new product are appeared or new process are appeared or new tool are available, a trial duration is required. Beside, because stored wafers are manual dispatched by operators, it is impossible to precisely forecast both degree of progress of each product and insufficiency of required materials.

In short, conventional dispatching method is manual and off-line or conventional semiconductor wafer manufacturing line and then on-line dynamic dispatching wafers into properly tools is not possible. Further, conventional dispatching system is not adaptive for it can not precisely forecast progress of the semiconductor wafer manufacturing line, and then it is difficult to properly adjust degree of progress of different product and to timely supply required materials. Therefore, it is desired to develop method and system to automatically real-time dispatched wafers into properly tools and precisely forecast progress of the semiconductor wafer manufacturing line.

SUMMARY OF THE INVENTION

One primary object of the invention is to reduce the risk of dispatch, both in lateness and inadequate quantity.

Another object of the invention is to reduce the cycle time and maximizes output.

A further object of the invention is to provide operators of tools an on-line dynamic dispatch way that does not rely on the subjective experience and judgment of human operators.

Still a further object of the invention is to provide an off-line dispatching simulation to provide dispatcher a forecast dispatching list about dispatch of production line and a warning list about both lack of materials and idle tools.

Objects of the invention also include automatically dispatch wafers (lots) and timely modifying dispatching priority of all wafers (lots).

In accordance with this invention, a method for dispatching wafers that fabricated in a department of factory is disclosed. The present method comprises following steps: Determines a rank list of numerous wafers, wherein the rank list is sorted by numerous priorities of wafers and each wafer is corresponding to an individual priority. Herein, these priorities are automatically calculated with numerous system variables that modified by a dispatcher. Then, receives a limitation database that limits numerous relations between these wafers and some tools. Herein, the limitation database comprises information about an exception rule and information about each wafer is belonged to a super hot run, a hot run, a rush run or a normal run. Moreover, the limitation database is provided by the dispatcher. Finally, dispatches wafers into tools automatically in accordance with the rank list and the limitation database.

In accordance with the invention, a system for processing numerous lots by some tools with automatic dispatch is present. The present system comprises numerous tools, a lots bank and a controller. Herein, each tool is configured to perform a succeeding process on a batch of lots, the lots bank are configured to store numerous lots, and the controller are coupled to these tools and the lots bank. Further, the controller is configured to automatically dispatch these lots into these tools in accordance with a limitation database and a priority database. The limitation database is provided by a dispatcher and, comprises information about a exception rule and information that is used to identify each of lots is belonged to a super hot run, a hot run, a rush run or a normal run. The priority database provides each lot an individual priority that is automatically calculated before the lot is dispatched, where several adaptable system variables are used to calculate these individual priorities.

Also in accordance with the invention, a system for dispatching wafers into tools is disclosed. The disclosed system comprises determining means, receiving means and dispatching means. Determining means is used to determine a rank list of numerous wafers, wherein the rank list is sorted by priorities of all wafers. Further, individual priority of each wafer is automatically calculated with some system variables that are modified by the dispatcher. Receiving means is used to receive a limitation database that is used to limit numerous relations between wafers and tools. Moreover, the limitation database comprises information about a exception rule and information that is used to identify each wafer is belonged to a super hot run, a hot run, a rush run or a normal run. Dispatching means is used to automatically dispatch wafers into tools in accordance with both the limitation base and the rank list.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The invention is used to automatically dispatch wafers into tools in accordance with input messages such as exception rule, correlative information and priority of each wafer, where tools are used to perform similar processes. Further, exception rule comprises messages about any specific wafer is assigned to what specified tool, exception rules also comprises correlative information which is used to identify each wafer is belonged to a super hot run, a hot run, a rush run, a rush run or a normal run. Beside, a proposed lot ranking algorithm (LRA) is used to calculate individual priority of each wafer. Moreover, when priorities of all wafers are available, a proposed lot assignment algorithm (LAA) is used to dispatch wafers into available tools in accordance with exception rule, information and priorities. Where these available tools are tools that have been finish (or almost finish) preceding processes and are able to process new wafers. Obviously, by comparing with conventional dispatching method and system, LRA and LAA are two noticeable characteristics of the proposed invention.

Furthermore, when a wafer belongs to a super hot run, the wafer is most preferentially to be processed even it is desired to interrupt current process of one required tool with lowest priority wafer. Next, when a wafer belongs to a hot run, the wafer is more preferentially to be processed. It means that the wafer is processed by required tool if current process of the tool can be finished in a predetermined Q-time duration, otherwise it is desired to interrupt current process of one required tool with lowest priority wafer. Moreover, when a wafer belongs to a rush run, the wafer is preferentially to be processed but no current process of required tool will be interrupted. Beside, when a wafer belongs to a normal run, the wafer can be processed by any available required tool. Further, as usual, whenever a wafer has been located on any specified tool but has not been processed or a wafer is dedicated to a specified tool by the exception rule, the wafer is processed by the specified tool.

Figure 1:
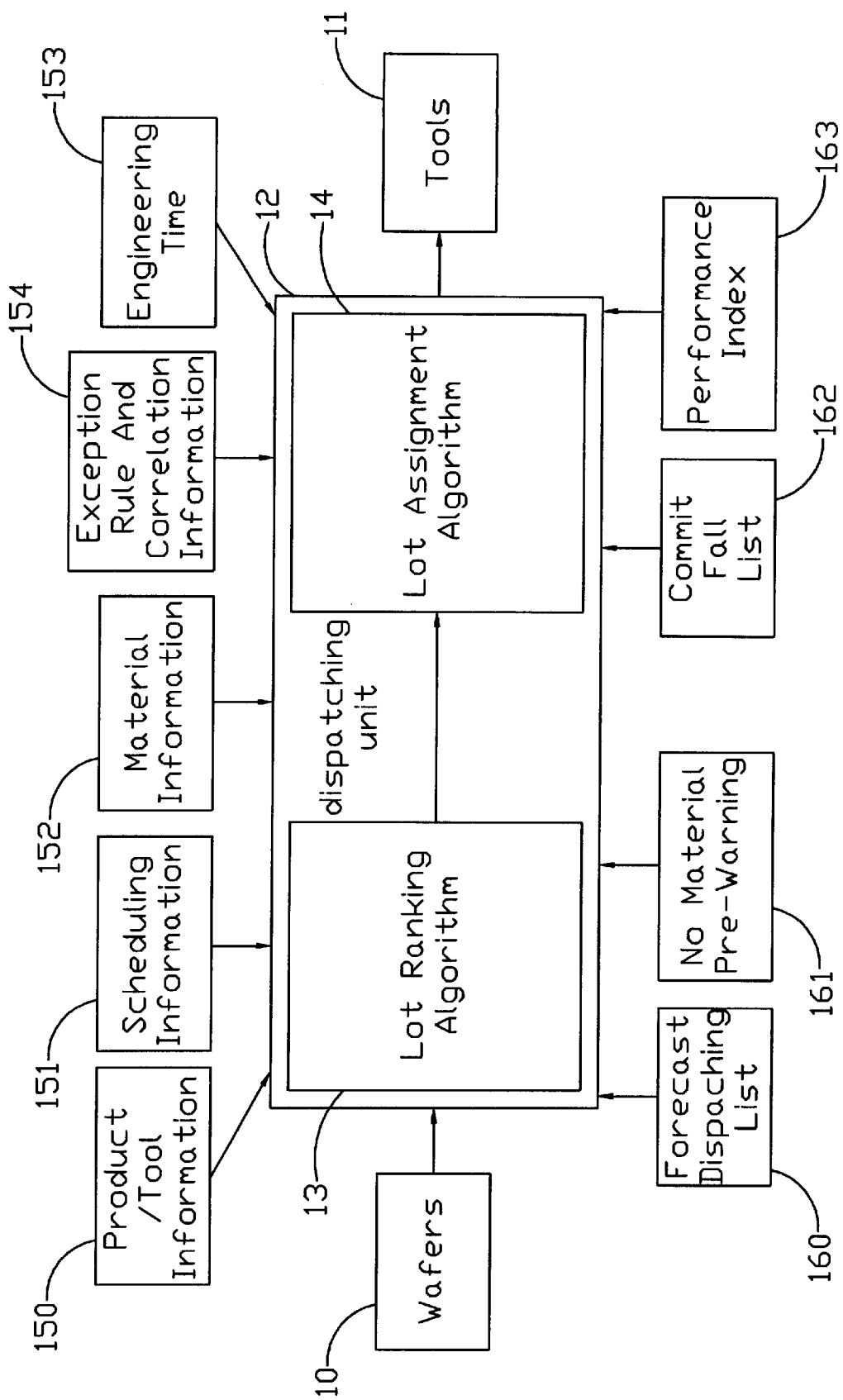
FIG. 1 is an illustration about fundamental figure of the invention.

The fundamental picture of the invention is illustrated in FIG. 1. As shown in FIG. 1, dispatching unit 12 automatically dispatches pending wafers 10 into available tools 11 in accordance with two algorithms: lot ranking algorithm 13 and lot assignment algorithm 14. Herein, lot ranking algorithm 13 is used to give each pending wafer 10 an individual priority and lot assignment algorithm 14 is used to dispatch pending wafers 10 by their priorities and other required message. On the other hands, execution of dispatching unit 12 at least requires following information: product/tool information 150, scheduling information 151, material information 152, engineering time 153, and exception rule and correlative information 154. Correspondingly, execution of dispatching unit 12 also at least provides following information: forecast dispatching list 160, no material pre-warring 161, commit fall list 162 and performance index 163.

In addition, as usual, all required information is provided before pending wafers 10 are dispatched. Moreover, product/tool information 150 comprises specifications of products of pending wafers 10 and statuses of tools 11. Scheduling information 151 comprises schedules and commit due date of pending wafers 10 (products). Material information 512 comprises amounts and qualifies of materials that are required during execution of tools 11. Engineering time 153 comprises messages about which tools can not be used to process pending wafers 10 and how long the duration is, wherein possible reasons includes the tool is maintained or is used to perform experiment. Exception rule and correlative information 154 comprises numerous exception rules and some correlative information. By comparison, forecast dispatching list 160 discloses how (pending) wafers 10 are dispatched into (available) tools 11, no material pre-warning 161 forenotices lack of any required materials, and both commit fall list 162 and performance index 163 forenotice result of dispatching unit 12.

Figure 2:
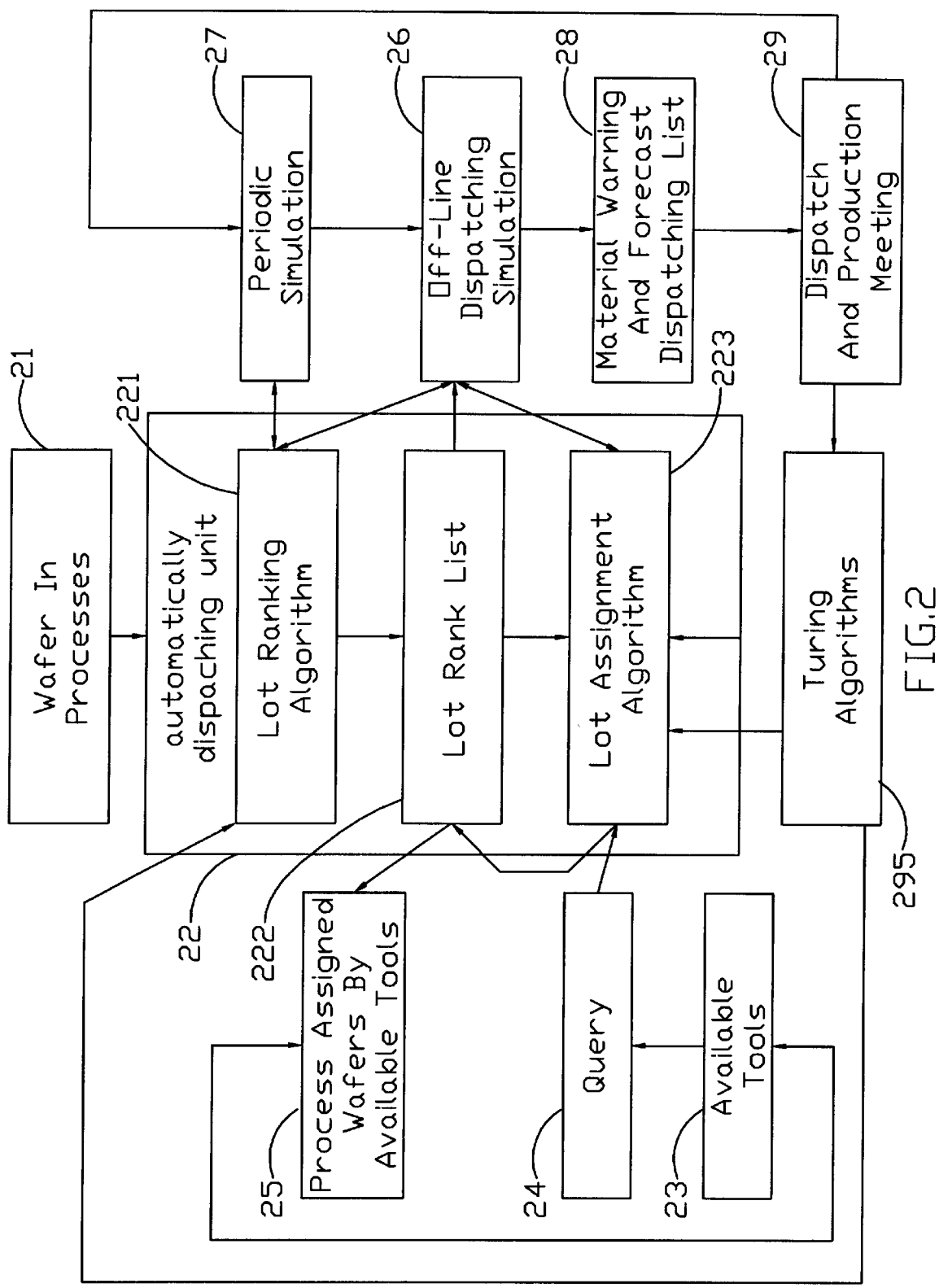
FIG. 2 is an illustration about an application of the present invention.

Application of the invention is further illustrated in FIG. 2. In short, wafers in process 21 (so-called pending wafers 10) are dispatched by automatically dispatching unit 22 and then wafers in process 21 are dispatched into available tools 23.

First of all, whenever some wafers in process 21 appear, automatically dispatching unit 22 makes use of lot ranking algorithm 221 to give each wafer an individual priority, and then these wafers are sorted by their priorities to form lot rank list 222, And, after some tools finish (or almost finish) preceding processes, these tools are available. Then, operators of available tools 23 send query 24 into automatically dispatching unit 22 to inquire what are next wafers (lots) to be processed by available tools 23. Whenever automatically dispatching unit 22 receives query 24, lot assignment algorithm 223 is used to assignment some lots inside lot rank list 222 into available tools 23, and then as processing block 25 shows, these assigned wafers (lots) are processed by available tools 23.

Moreover, in order to reflect variation of practical production line such as new orders, new schedule of each product and stock of required materials, lot ranking algorithm 221 is periodic simulated as periodic block 27 shows. Moreover, whenever automatically dispatching unit 22 assigns some wafers (lots) into available tools 23, off-line dispatching simulation 26 is executed to reflect variation of lot rank list 22 and then both lot ranking algorithm 221 and lot assignment algorithm 223 are modified. Further, as shown in FIG. 2, incident to dispatch of lots, material warning and forecast dispatching list 28 is provided and is used by dispatch and output meeting 29 to keep track of evolution of practical production line. Thus, in accordance with the difference between uptodate result of automatically dispatching unit 22 and required result of production line, detail of periodic simulation block 27 is modified to properly adjust result of automatically dispatching unit 22, and as turning algorithm block 295 shows that both lot ranking algorithm 221 and lot assignment algorithm 223 are modified to properly amend result of automatically dispatching unit 22. Furthermore, not only system variables of both algorithms are adjusted but also both exception rules and correlative information are adjusted.

In accordance with previous discussion of the proposed invention, automatically dispatching unit 22 provides an on-line dynamic dispatching result and then dispatch of lots is independent on the subjective experience and judgment of human operator. Further, because both algorithms are adjustable, the invention provides dispatchers of production line an off-line dispatching simulation to effectively handle dispatching result of automatically dispatching unit 22. Therefore, by properly modification, the proposed invention can reduce cycle time of each tool and maximizes output of the production line but. Certainly, the proposed invention also can reduce the risk of dispatch, both in priorities of lateness and inadequate quantity. However, the efficiency of dispatch is strongly dependent on both used algorithms and how they are modified.

Figure 3:
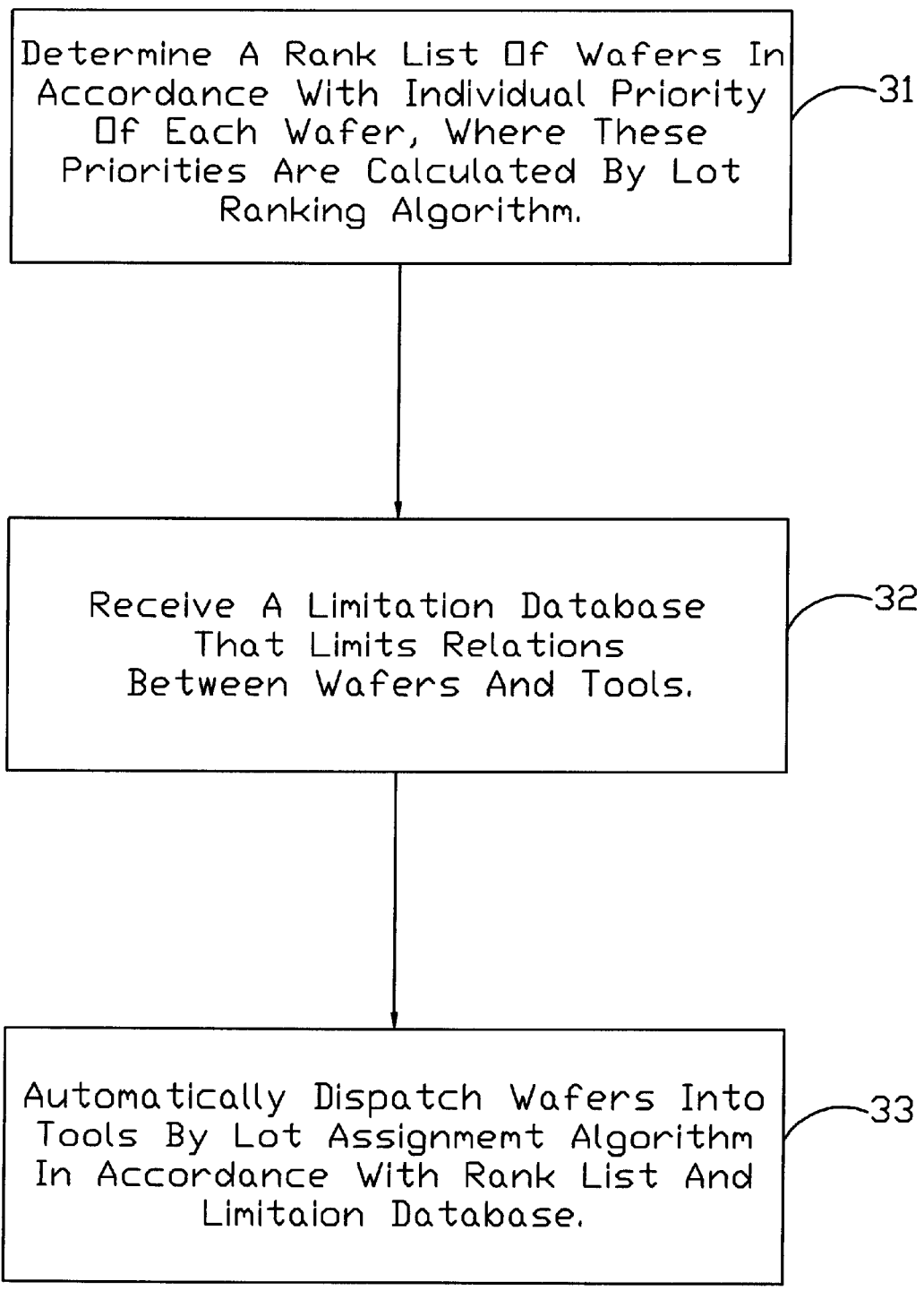
FIG. 3 is the briefly flow chart of first embodiment of the invention.

One preferred embodiment of the proposed invention is a method for dispatching wafers that fabricated in a department of factory, wherein numerous tools, such as test equipment or etching equipment, are used to process many wafers (lots) that preceding processes are finished. As the flow chart shown in FIG. 3, the present method is executed with following essential steps: First, as determining block 31 shows, determines a rank list of numerous wafers that locates inside a wafers bank. Herein, the rank list is sorted by numerous priorities of wafers and each wafer is given an individual priority. Moreover, these priorities are automatically calculated by the lot ranking algorithm where numerous system variables that are modified by a dispatcher. Second, as receiving block 32 shows, receives a limitation database that includes number relations between these wafers and numerous tools. Herein, the limitation database comprises an exception rule and information about each wafer is belonged to a super hot run, a hot run, a rush run, a rush run or a normal run. Moreover, the limitation database is provided by the dispatcher, and each of tools is used to perform a specified process on some wafers and a process time is required to perform the specified process. Finally, as dispatch block 33 shows, automatically dispatches these wafers into these tools by the lot assignment algorithm in accordance with both the rank list and the limitation database.

In the lot ranking algorithm, priority of each wafer is a summation of nine terms and the priority is automatically calculated when any wafer first time appears in the wafer bank. However, it should be noticed that priorities of all wafers are automatically recalculated per a specific duration, where the specific duration is assigned by the dispatcher. Further, priorities of wafers also are automatically recalculated whenever wafers inside the wafer bank is changed, no matter a new wafer is appeared or some established wafers are processed by tools. Beside, priorities of wafers also are automatically recalculated whenever the dispatcher adjusts relative information of RRA. Relative information includes the limitation database or correlative system variables, where system variables are used to adjust calculating result of RRA. However, one principal object of the lot ranking algorithm is to maximize total output of the department of factory.

Furthermore, nine terms of priority are process time term, Q-Time term, waiting status term, commit due date term, output term, hot run priority, idle term, super hot run term and exception rule term. Beside, owing to the fact that importance of each term is different to other terms, the weight of each term also is different to other terms and weight of each term is directly proportion to importance of this term. In general, among previous nine terms, the more preceding term with the more importance.

First of all, process time term reflects effect of the process time and the normal rule is that product of wafer with shorter process time is presidential to be processed except the process time term is switched. Analogously, Q-Time term reflects effect of the Q-Time that is the period since a wafer is inside the wafers bank i.e. the period that a wafer has been waited to be processed, and the normal rule is that wafer with longer Q-Time is presidential to be processed except the Q-Time term is switched. Moreover, the waiting status term is used to reflect whether a wafer is ready or not, where possible reasons that the wafer is not ready to be processed include at least one of required materials is lacked. Further, commit due date term is increasing when the commit due date is approached and is more increasing when product of a wafer is overdue. Further, output term is increasing when the current output is lesser than scheduled output and is decreasing when the current output is larger than scheduled output. Moreover, the hot run term is active only when the wafer belongs to a hot run. The idle term is active only when the wafer has been located on one available tool but has not been processed, wherein possible reasons that a wafer is idle comprise required materials are lacked. Consequentially, the super hot run term is active only when the wafer belongs to a super hot run. Finally, the exception rule is active only when at least one exception rule is assigned to these wafers.

Incidentally, the only difference between rush run and normal run is that both process time priority and Q-Time priority are equal to one for the rush run but are regulative for normal run, where regulative range is between zero and one. In other words, except calculation of process time priority and Q-Time term, dispatch of rush run is equal to dispatch of normal run. Thus, rush run and normal run do not separate discuss in following description of the invention and preferred embodiments.

Owing to the truth that super hot run is most preferentially assigned than both hot run and normal run, and hot run is more preferentially assigned than normal run. It is significant for priority of super hot run term (super hot run term is larger than zero) is larger than priority of hot run (super hot run term is equal to zero), and priority of hot run (hot run priority is larger than zero) is larger than priority of normal run (hot run priority is equal to zero).

Anyway, not matter what kind of wafer is assigned, the corresponding assignment algorithm must satisfy following rules except sometime some exceptions are used:

(1) When a wafer is assigned to a specified tool, the wafer only can be processed by the specified tool.
(2) Idle tool is preferentially used.
(3) When several tools are accessible, the tool with same product as the wafer is preferentially used.
(4) When several tools are accessible, the tool with lowest priority wafer is preferentially used.
(5) When several wafers can be processed by a tool, the wafer with product as product of preceding process of the tool is preferentially to be processed.

(6) Wafer with product that scheduled output is not achieved is preferentially dispatched.

(7) Higher priority wafer is preferentially dispatched.

(8) Current process of tool with lowest priority wafer is preferentially interrupted.

(9) Before dispatch and process any wafer, it is necessary to check whether required materials are enough and available.

Figure 4:
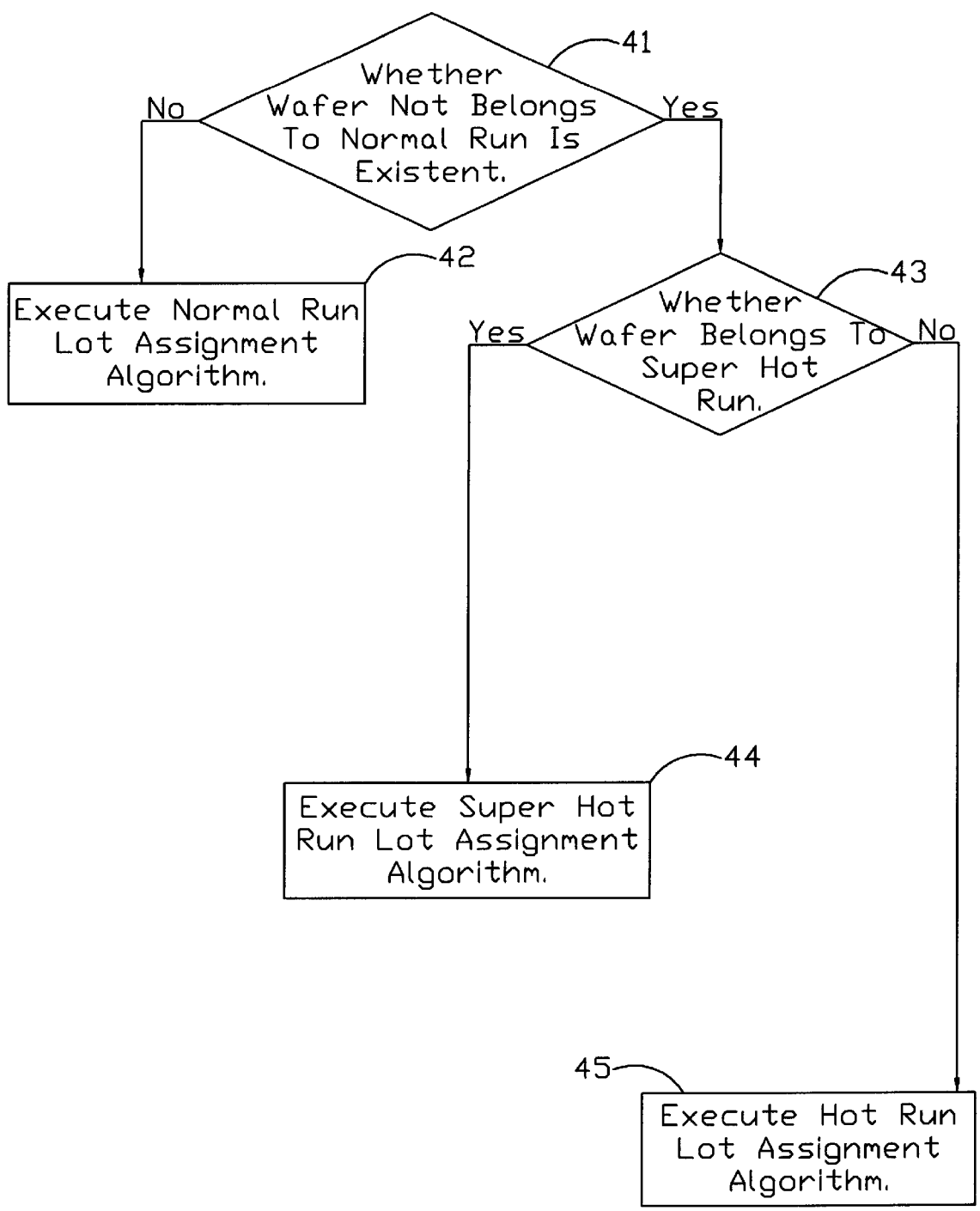
FIG. 4 is a flow chart that shows how wafer is assigned in accordance with the first embodiment.

Flow of application of the lot assignment algorithm is briefly discussed in following paragraphs and a capsule flow chart is shown in FIG. 4. First of all, as first determine block 41 shows, it is necessary to determine whether a wafer does not belong to normal run is existent. If no wafer belongs to super hot run or hot run is existent, then as normal run block 42 shows that normal run lot assignment algorithm is executed, otherwise as second determine block 43 shows, it is necessary to decide whether the wafer is belong to super hot run or not. If it belongs to super hot run, then as super hot run block 44 shows that super hot run lot assignment algorithm is executed, otherwise as hot run block 45 shows that hot run lot assignment algorithm is executed.

When a wafer belongs to the super hot run is dispatched to any available tool to cause a specific process is processed on the wafer, applied result of the lot assignment algorithm can be summarized as following rules:

(1) When the wafer is assigned to a specified tool by the exception rule and product of preceding process of the specified tool is equal to product of the wafer, then preceding process of the specified tool is interrupted and the specified tool is used to process the wafer.

(2) When the wafer is assigned to a specified tool and product of preceding process of the specified tool is not equal to product of the wafer, and required materials of the specific process are available. Preceding process of the specified tool is interrupted and the specified tool is used to process the wafer.

(3) When the wafer is assigned to a specified tool and product of preceding process of the specified tool is not equal to product of the wafer, and required materials of the specific process are not all available. Then sends a shortage warning message.

(4) When the wafer is not assigned to any specified tool and an idle tool with enough required materials of the specific process is available, then the idle tool is used to process the wafer.

(5) When the wafer is not assigned to any specified tool and no idle tool with enough required materials of the specific process is not available, and at least one specific tool with same product as the wafer is available. Then preceding process of one specific tool that with lowest priority is interrupted to process the wafer by the chose specific tool.

(6) When the wafer is not assigned to any specified tool and no idle tool with enough required materials of the specific process is available, and not only no tool with same product as the wafer is available but also required materials of the specific process are not all available. The shortage warning message is sent.

(7) When the wafer is not assigned to any specified tool and no idle tool with enough required materials of the specific process is available, and no tool with same product as the wafer is available but required materials of the specific process are available. Then preceding process of one available tool that with lowest priority is interrupted and then the chose tool is used to process the wafer.

In addition, required materials comprise probe-card when available tools belong to test equipment, and required materials comprises solution when available tools belong to wet etching equipment.

When wafer belongs to hot run is dispatched to available tools to cause a specific process is processed on the wafer, applied result of the lot assignment algorithm for hot run wafer can be summary as following rules:

(1) When the wafer is assigned to a specified tool and product of preceding process of the specified tool is equal to product of the wafer, then processes the wafer by the specified tool after preceding process of the specified tool is finished.

(2) Second, when the wafer is assigned to a specified tool and product of preceding process of the specified tool is not equal to product of the wafer, and required materials of the specific process are available. Processes the wafer by the specified tool after preceding process of the specified tool is finished.

(3) When the wafer is assigned to the specified tool and product of preceding process of the specified tool is not equal to product of the wafer, and required materials of the specific process are not all available. Sends a shortage warning message.

(4) When the wafer is not assigned to any specified tool and an idle tool with all enough required materials of the specific process are available, then process the wafer by the idle tool.

(5) When the wafer is not assigned to any specified tool and no idle tool with enough required materials of the specific process is available, and not only at least one specific tool with same product as the wafer is available but also preceding processes of the specific tool can be finished in a Q-Time duration is available. Process the wafer with a chose specific tool that with lowest priority when preceding process of the chose specific tool is finished.

(6) When the wafer is not assigned to any specified tool and no idle tool with enough required materials of the specific process is available, and though at least one specific tool with same product as the wafer is available but no specific tool that preceding process can not be finished in the Q-Time duration is available. Interrupts preceding process of a chose specific tool with lowest priority to process the wafer.

(7) When the wafer is not assigned to any specified tool and no idle tool with enough required materials of the specific process is available, and not only no tool that fabricates same product as the wafer is available but also required materials of the specific process are not all available. Sends a shortage warning message.

(8) When the wafer is not assigned to any specified tool and no idle tool with enough required materials of the specific process is available, and no the available tool with same product as the wafer is exist but required materials of the specific process are available, and at least one third specific tool that can finish preceding process in the Q-Time duration is available. Process the wafer by an earliest third specific tool that preceding process of the chose specific is finished earliest.

(9) When the wafer is not assigned to any specified tool and no idle tool with enough required materials of the specific process is available, and no available tool with same product as the wafer is exist but required materials of the specific process are available, and all the available tools can not finish preceding process in the Q-Time duration. Interrupt preceding process of a lowest available tool to process the wafer where the lowest available tool is one of the available tools that priority of product of preceding process is lowest.

However, because importance of super hot run is larger than hot run, any tool that process wafer belongs to super hot run is not interrupted in hot run assignment algorithm. Moreover, any tool that process wafer belongs to hot run also usually is not interrupted in hot run assignment algorithm except it is assigned. Additional, required materials comprise probe-card when the specified tool belongs to test equipment, and the Q-Time duration is a system variable that modified by dispatcher.

Furthermore, when preceding process of a specific tool is finished and the specific tool can be used to process a succeeding process, operator of the specific tool will query what is next choice (wafers or lot) to be processed. If there is no available super hot run or hot run then wafers belong to normal run are dispatched. Applied result of the lot assignment algorithm for normal run wafer can be summary as following rules:

(1) When a specified product is assigned to be fabricated by a specific tool in accordance with the exception rule and some specific wafers with the specified product are available, and when product of the preceding process of the specific tool is equal to the specified product. The specific tool is used to process some of the first specific wafers that with highest priority to fabricated the specified product.

(2) When a specified product is assigned to be fabricated by a specific tool in accordance with the exception rule and some specific wafers with the specified product are available, and when product of the preceding process of the specific tool is not equal to the specified product but all required materials of the specific process are available. The specific tool is used to process some specific wafers that with highest priority to fabricate the specified product.

(3) When a specified product is assigned to be fabricated by a specific tool in accordance with the exception rule and some specific wafers with the specified product are available, and when product of preceding process of the specific tool is not equal to the specified product and required materials of the specific process are not all available. Sends a shortage warning message. Further, the assignment relation between the specific tool and the specified product is cancelled.

(4) When the specific tool is not assigned to process any specified product and scheduled output of product of the preceding process of the specific tool is not achieved, and some specific wafers with same product as the preceding process of the specific tool are available. The specific tool is used to process some of these specific wafers that with highest priority.

(5) When the specific tool is not assigned to process any specified product and scheduled output of product of the preceding process of the specific tool is not achieved, and no wafer with same product as the preceding process of the specific tool is available but some specific wafers with both different products and sufficient required materials of the different products are available. The specific tool is used to process numerous the fifth specific wafers that with highest priority.

(6) When the specific tool is not assigned to process any specified product and scheduled output of product of the preceding process of the specific tool is not achieved, and no wafer with same product as the preceding process of the specific tool is available and also no wafer with both different product and sufficient required materials of the different product is available. The specific tool is idle and a wafer pull-in list is sent.

(7) When the specific tool is not assigned to process any specified product and scheduled output of product of the preceding process of the specific tool is achieved, and when no wafer with product that scheduled output is not achieved is available and some specific wafers with both same product as the preceding process of the specific tool and sufficient materials of these specific product are available. The specific tool is used to process numerous the sixth specific wafers that with highest priority.

(8) When the specific tool is not assigned to process any specified product and scheduled output of product of the preceding process of the specific tool is achieved, and when no wafer with product that scheduled output is not achieved is available and no wafer with same product as the preceding process of the specific tool is available, and when some specific wafers that corresponding product is not equal to product of the preceding process of the specific tool are available and sufficient required materials of these specific wafers are available. The specific tool is used to process numerous the seventh specific wafers that with highest priority.

(9) When the specific tool is not assigned to process any specified product and scheduled output of product of the preceding process of the specific tool is achieved, and when no wafer with product that scheduled output is not achieved is available and no wafer with same product of the specific tool as the preceding process is available, and when no wafer with sufficient required materials is available. The specific tool is idle and the wafer pull-in list is sent.

(10) When the specific tool is not assigned to process any specified product and scheduled output of product of the preceding process of the specific tool is achieved, and when some specific wafers with product that scheduled output is not achieved are available and required materials of these wafers are available. The specific tool is used to process some of the specific wafers that with highest priority.

(11) When the specific tool is not assigned to process any specified product and scheduled output of product of the preceding process of the specific tool is achieved, and when some specific wafers with product that scheduled output are not achieved are available but required materials of these specific wafers are not available, and when some specific wafers with product that required materials are sufficient are available. The specific tool is used to process some of specific wafers that with highest priority.

(12) When the specific tool is not assigned to process any specified product and scheduled output of product of the preceding process of the specific tool is achieved, and when some specific wafers with product that scheduled output is not achieved are available but required materials of these specific wafers are not available, and when no wafer with product that required materials is sufficient is available. The specific tool is idle and the wafer pull-in list is sent.

Positively, the embodiment further comprising when the assignment relation between the specific tool and any specified product is cancelled, re-dispatching wafers into the specific tool in accordance with an antecedent rule that the specific tool is not assigned to process any specified product. Beside, the embodiment also further comprising when the shortage warning message is sent, re-dispatching the wafer in accordance with a preferential rule that wafer with product that required materials are not all available is not dispatched until required materials are available.

Figure 5:
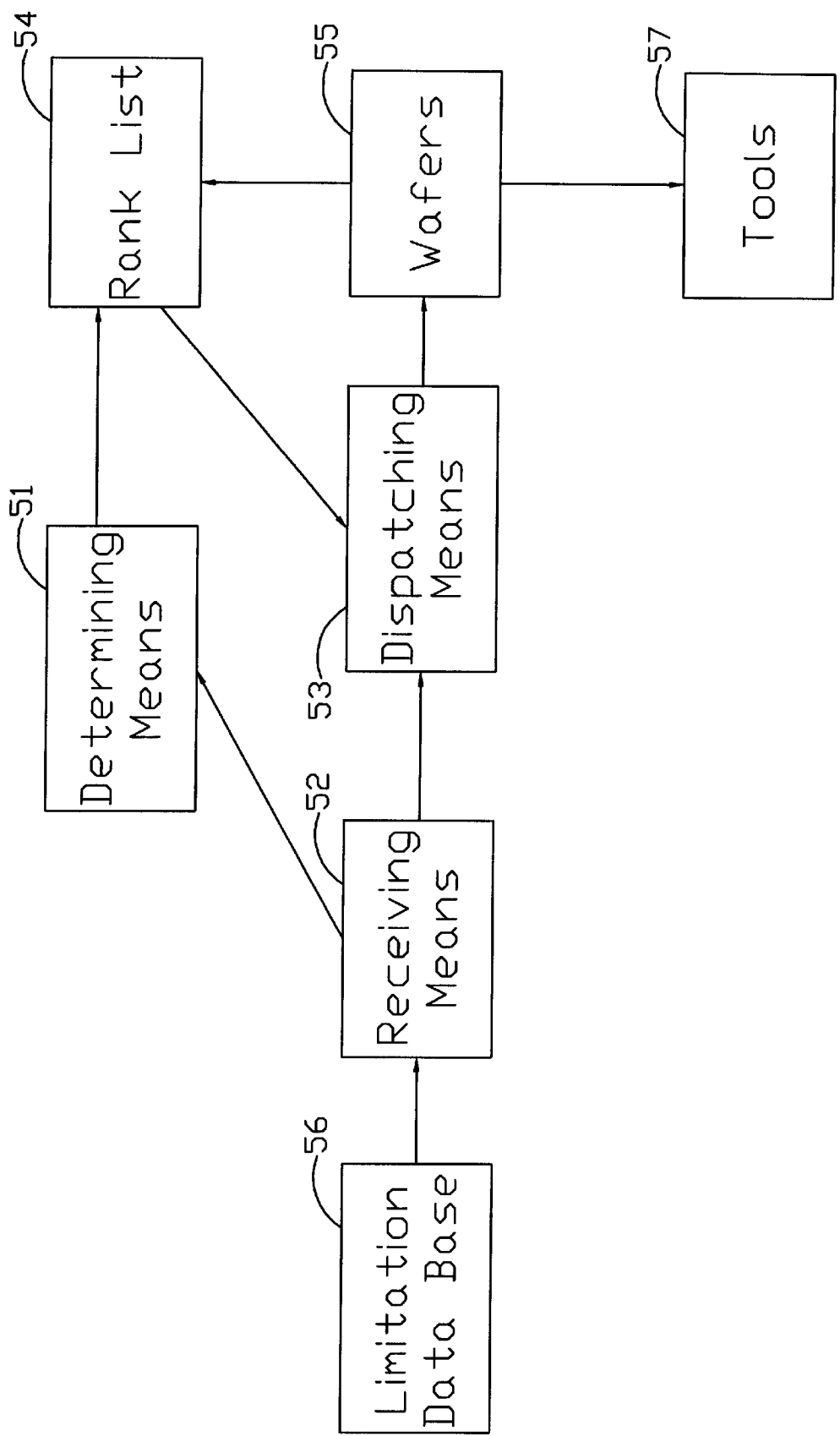
FIG. 5 shows brief structure and related parts of a second embodiment.

Second preferred embodiment of the invention is a system for dispatching wafers into tools. As shown in FIG. 5, the system comprises determining means 51, receiving means 52 and dispatching means 53. In general, determining means 51 is used to determine rank list 54 of numbers wafers 55, wherein rank list 53 is sorted by priorities of wafers 55 and each wafer 55 is corresponding to an individual priority that provided by the lot ranking algorithm. Moreover, these priorities are automatically calculated in accordance with the lot ranking algorithm and some system variables that modified by the dispatcher. Further, receiving means 52 is used receive limitation database 56 that limits relations between wafers 55 and tools 57. Herein, limitation database 56 comprises information about an exception rule and information about each wafer 55 is belonged to super hot run, hot run, rush run or normal run. And each tool 57 is used to perform a specified process on wafer 55 and a process time is required to perform the specified process. Beside, dispatching means 53 is used to automatically dispatch wafers into numerous available tools 57 in accordance with the lot assignment algorithm and both rank list 54 and limitation database 56. Herein, available tools 57 are part of tools 57 and are tools that preceding processes are finished (or almost is finished).

Naturally, because contents of both lot assignment algorithm and lot assignment algorithm are detailed discussed in preferred embodiment, duplicate discussion is omitted. Further, these means are only limited by their functions and are not limited by practical equipment. In other words, practical equipment is not key-point of the second preferred embodiment.

Figure 6:
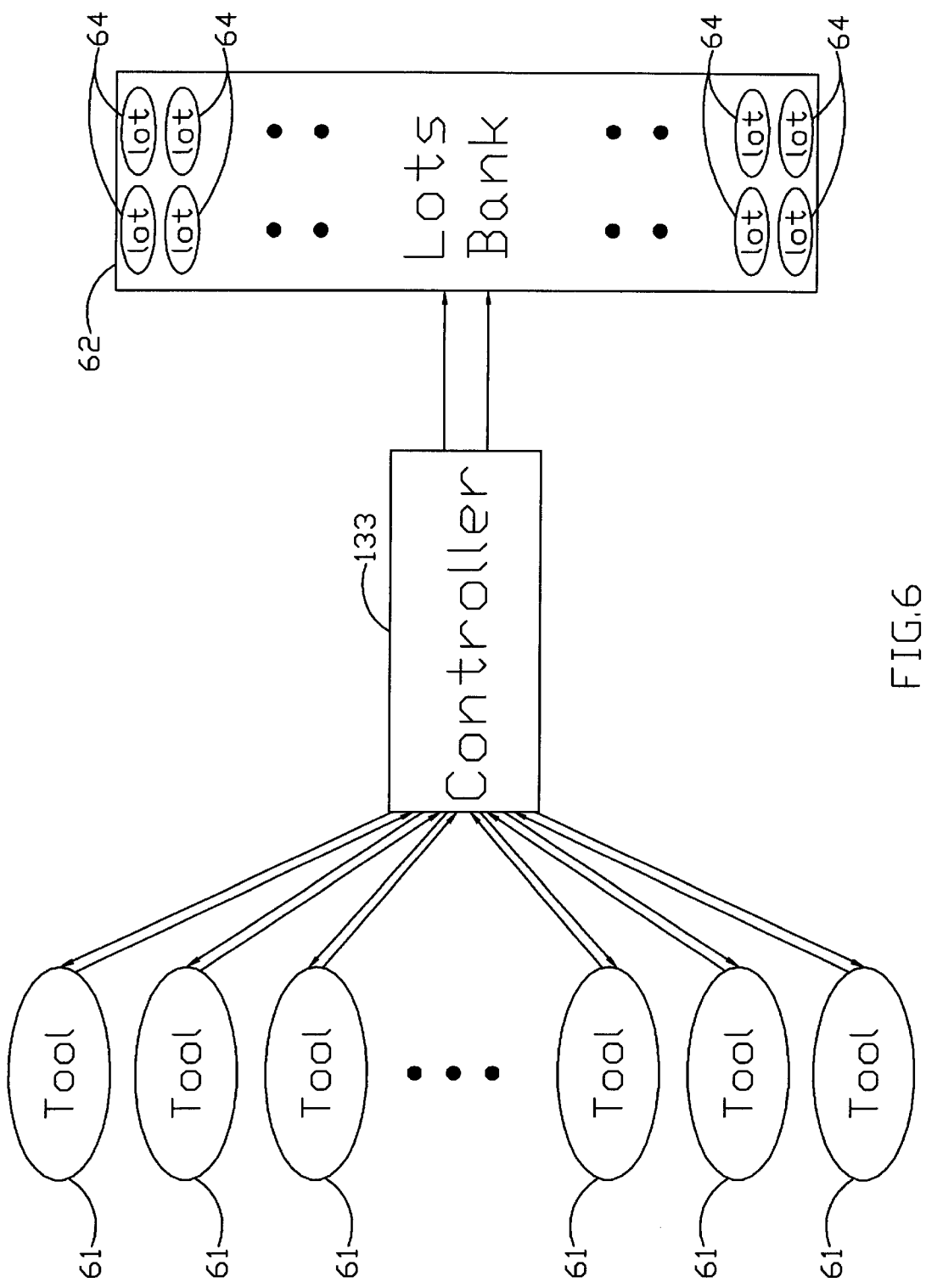
FIG. 6 shows brief structure and related parts of a third embodiment.

Third preferred embodiment of the invention is a system for processing numerous lots by some tools with automatic dispatch in a factory. As shown in FIG. 6, the system comprises numerous tools 61, a lot bank 62 and a controller 63. Herein, tools 61 are configured to perform some succeeding processes on a batch of lots 64. Lots bank 62 is configured to store number of lots 64. And controller 63 is coupled to both tools 61 and lots bank 62. Beside, controller 62 is configured to automatically dispatch lots 64 into some available tools in accordance with the lot assignment algorithm with a limitation database and a priority database. Moreover, available tools are part of tools 61 and the limitation database is provided by the dispatcher. The limitation database comprises an exception rule and information about each lot is belonged to super hot run, hot run, rush run or normal run. The priority database provides each lot 64 an individual priority that is automatically calculated before lot 64 is dispatched, where the dispatch is made in according with a lot ranking assignment with numerous system variables that are adaptable.

Significantly, by comprising FIG. 6 and FIG. 5, it is obvious that the system proposed by second embodiment is controller 63 of the third embodiment. Also, by comprising FIG. 6 and FIG. 1, it is obvious that function of controller 63 is equal to function of dispatching unit 12. In other words, the preferred embodiment can be used to properly dispatched wafers (lots) into available tools by application of both lot ranking algorithm and lot assignment algorithm.

Obviously, numerous additional modifications and variations of the present invention are possible in light of the above teachings. It is therefore to be understood that within the scope of the appended claims, the invention may be practiced otherwise than as specifically described herein.

What is claimed is:

1. A method for dispatching wafers, said method comprising:

determining a rank list of a plurality of wafers, wherein said rank list is sorted by a plurality of priorities of said wafers and each said wafer having an individual priority, wherein said priorities are automatically calculated with a plurality of system variables that are modified by a dispatcher;

receiving a limitation database which limits a plurality of relations between said wafers and a plurality of tools, wherein said limitation database comprises information about an exception rule and other information that is used to identify each said wafer is belonged to a super hot run, a hot run, a rush run or a normal run, each of said tools being used to perform a specified process on said wafers and a process time being required to perform said specified process, wherein said limitation database is provided by said dispatcher; and automatically dispatching said wafers into a portion of said tools that are available in accordance with said rank list and said limitation database.

2. The method according to claim 1, wherein a specified one of said wafers is processed by a specified one of said tools whenever said specified wafer has been located on said specified tool but has not been processed.

3. The method according to claim 1, wherein a specified one of aid wafers is processed by a specified one of said tools whenever said specified wafer is dedicated to said specified tool by said exception rule.

4. The method according to claim 1, wherein said automatically calculated priority is a summation of nine terms, said terms consisting of process time term, Q-Time term, waiting status term, commit due date term, output term, hot run term, idle term, super hot run term and exception rule term.

5. The method according to claim 4, wherein said process time term reflects effect of the process time and the normal rule is that wafer with shorter process time product is presidential to be processed except said process time term is switched.

6. The method according to claim 4, wherein said Q-Time term reflects effect of the Q-time that is the period since a wafer has been waited to be processed, and the normal rule is that wafer with longer Q-Time is presidential to be processed except said Q-Time term is switched.

7. The method according to claim 4, wherein said waiting status term is used to reflect whether a wafer is ready to be processed or not.

8. The method according to claim 4, wherein said commit due date term is increasing when the commit due date is approached and is more increasing when product is overdue.

9. The method according to claim 4, wherein said output term is increasing when the current output is lesser than scheduled output and is decreasing when the current output is lager than scheduled output.

10. The method according to claim 4, wherein said hot run term is active only when wafer belong to said hot run.

11. The method according to claim 4, wherein said idle term is active only when wafer has been located on said available tool but has not been processed.

12. The method according to claim 4, wherein said super hot run term is active only when said wafer belongs to said super hot run.

13. The method according to claim 4, wherein said exception rule is active only when at least one of said exception rule is assigned.

14. The method according to claim 1, wherein said priorities of said wafers are automatically recalculated per a specific duration that is assigned by said dispatcher.

15. The method according to claim 1, wherein said priorities are automatically recalculated whenever one of said wafers is processed by one of said tools.

16. The method according to claim 1, wherein said priorities are automatically recalculated whenever a new wafer is appeared.

17. The method according to claim 1, wherein said priorities are automatically recalculated whenever said limitation database is modified.

18. The method according to claim 1, wherein said priorities are automatically recalculated whenever at least one of said system variables is modified.

19. The method according to claim 1, when a wafer that belongs to said super hot run is appeared, said wafer being dispatched into one of said available tools to cause a specific process be processed on said wafer in accordance with these rules as following:
when said wafer is assigned to a specified tool by said exception rule and product of preceding process of said specified tool is equal to product of said wafer, then interrupts preceding process of said specified tool to process said wafer by said specified tool;
when said wafer is assigned to said specified tool and product of preceding process of said specified tool is not equal to product of said wafer, and when all required materials of said specific process are available, then interrupts preceding process of said specified tool to process said wafer by said specified tool;
when said wafer is assigned to said specified tool and product of preceding process of said specified tool is not equal to product of said wafer, and when required materials of said specific process are not all available, then sends a shortage warning message;
when said wafer is not assigned to any specified tool and an idle tool with enough required materials of said specific process is available, then said idle tool is used to process said wafer;
when said wafer is not assigned to any specified tool and an idle tool with enough required materials of said specific process is not available, and when at least one specific tool with same product as said wafer is available, then preceding process of a chose said specific tool that with lowest priority is interrupted to processed said wafer by chose said specific tool;
when said wafer is not assigned to any specified tool and no idle tool with enough required materials of the specific process is available, and when no tool with same product as the wafer is available and when required materials of the specific process are not all available, then sends said shortage warning message; and
when said wafer is not assigned to any specified tool and no idle tool with enough required materials of the specific process is available, and when no tool with same product as said wafer is available but required materials of said specific process are available, then preceding process of a chose said available tool that with lowest priority is interrupted to processed the wafer.

20. The method according to claim 19, wherein said materials comprise probe-card when said available tools belong to test equipment.

21. The method according to claim 1, when a wafer that belongs to said hot run is appeared, said wafer being dispatched into one of said available tools to cause a specific process be processed on said wafer in accordance with these rules as following:
when said wafer is assigned to a specified tool and product of preceding process of said specified tool is equal to product of said wafer, then processes said wafer by said specified tool when preceding process of said specified tool is finished;
when said wafer is assigned to said specified tool and product of preceding process of said specified tool is not equal to product of said wafer, and all required materials of said specific process are available, then processes said wafer by said specified tool when preceding process of said specified tool is finished;
when said wafer is assigned to said specified tool and product of preceding process of said specified tool is not equal to product of said wafer, and required materials of said specific process are not all available, then sends a shortage warning message;
when said wafer is not assigned to any specified tool and an idle tool with enough required materials of said specific process is available, then process said wafer by said idle tool;
when said wafer is not assigned to any specified tool and no idle tool with enough required materials of said specific process is available, and when at least one first specific tool with same product as said wafer is available and preceding processes of said first specific tool can be finished in a Q-Time duration is available, then process said wafer with a chose said first specific tool that with lowest priority when preceding process of said chose first specific tool is finished;
when said wafer is not assigned to any specified tool and no idle tool with enough required materials of said specific process is available, and when at least one second specific tool with same product as said wafer is available and no said second specific tool that preceding process can not be finished in said Q-Time duration is available, then interrupts preceding process of a chose said second specific tool that with lowest priority to process said wafer;
when said wafer is not assigned to any specified tool and no idle tool with enough required materials of said specific process is available, and when no tool that fabricates same product as said wafer is available and when required materials of said specific process are not all available, then sends said shortage warning message;
when said wafer is not assigned to any specified tool and no idle tool with enough required materials of said specific process is available, and no said available tool with same product as said wafer is exist but required materials of said specific process are available, and at least one third specific tool that can finish preceding process in said Q-Time duration is available, then process said wafer by an earliest third specific tool that preceding process of said chose specific is finished earliest; and
when said wafer is not assigned to any specified tool and no idle tool with enough required materials of said specific process is available, and no available tool with same product as said wafer is exist but required materials of said specific process are available, and all said available tools can not finish preceding process in said Q-Time duration, then interrupt preceding process of a lowest available tool to process said wafer where said lowest available tool is one of said available tools that priority of product of preceding process is lowest.

22. The method according to claim 21, wherein said required materials comprise probe-card when said available tools belong to test equipment.

23. The method according to claim 1, when preceding process of a specific tool is finished and said specific tool can be used to process a succeeding process, one of said wafers that belongs to said normal run is dispatched into said specific tool in accordance with these rules as following:

when a specified product is assigned to be fabricated by said specific tool in accordance with said exception rule and when a plurality of first specific wafers with said specified product are available, and when product of said preceding process is equal to said specified product, then said specific tool is used to process some of said first specific wafers that with highest priority to fabricated said specified product;

when a specified product is assigned to be fabricated by said specific tool in accordance with said exception rule and when a plurality of second specific wafers with said specified product are available, and when product of said preceding process is not equal to said specified product but all required materials of said specific process are available, then said specific tool is used to process some of said second specific wafers that with highest priority to fabricate said specified product;

when a specified product is assigned to be fabricated by said specific tool in accordance with said exception rule and when a plurality of third specific wafers with said specified product are available, and when product of said preceding process is not equal to said specified product and required materials of said specific process are not all available, then sends a shortage warning message;

when said specific tool is not assigned to process any specified product and scheduled output of product of said preceding process is not achieved, and a plurality of fourth specific wafers with same product as said preceding process are available, then said specific tool is used to process some of said fourth specific wafers that with highest priority;

when said specific tool is not assigned to process any specified product and scheduled output of product of said preceding process is not achieved, and no wafer with same product as said preceding process is available but a plurality of fifth specific wafer with different products and sufficient required materials of said different products are available, then the specific tool is used to process a plurality of said fifth specific wafers that with highest priority;

when said specific tool is not assigned to process any specified product and scheduled output of product of said preceding process is not achieved, and no wafer with same product as said preceding process of said specific tool is available and no wafer with both different product and sufficient required materials of said different product is available, then said specific tool is idle and a wafer pull-in list is sent;

when said specific tool is not assigned to process any specified product and scheduled output of product of said preceding process is achieved, and when no wafer with product that scheduled output is not achieved is available and a plurality of sixth specific wafer with same product as said preceding process and sufficient materials of said sixth specific product are available, then the specific tool is used to process a plurality of said sixth specific wafers that with highest priority;

when said specific tool is not assigned to process any specified product and scheduled output of product of said preceding process is achieved, and when no wafer with product that scheduled output is not achieved is available and no wafer with same product as said preceding process is available, and when a plurality of seventh specific wafers that corresponding product is not equal to product of said preceding process are available and sufficient required materials of said seventh specific wafers are available, then said specific tool is used to process a plurality of said seventh specific wafers that with highest priority;

when said specific tool is not assigned to process any specified product and scheduled output of product of said preceding process is achieved, and when no wafer with product that scheduled output is not achieved is available and no wafer with same product as said preceding process is available, and when no wafer with sufficient required materials is available, then said specific tool is idle and said wafer pull-in list is sent;

when said specific tool is not assigned to process any specified product and scheduled output of product of said preceding process is achieved, and when a plurality of eighth specific wafers with product that scheduled output is not achieved are available and required materials of said eighth specific wafers are available, then said specific tool is used to process some of said eighth wafers that with highest priority;

when said specific tool is not assigned to process any specified product and scheduled output of product of said preceding process is achieved, and when a plurality of ninth specific wafer with product that scheduled output are not achieved are available but required materials of said ninth specific wafers are not available, and when a plurality of tenth specific wafer with product that required materials are sufficient are available, then said specific tool is used to process a plurality of said tenth specific wafers that with highest priority; and when said specific tool is not assigned to process any specified product and scheduled output of product of said preceding process is achieved, and when a plurality of eleventh specific wafer with product that scheduled output is not achieved are available but required materials of said eleventh specific wafers are not available, and also when no wafer with product that required materials is sufficient is available, then said specific tool is idle and said wafer pull-in list is sent.

24. The method according to claim 23, further comprising when said shortage warning message is sent, re-dispatching said wafer in accordance with a preferential rule that wafer with product that required materials are not all available is not dispatched until required materials are available.

25. The method according to claim 23, further comprising when the assignment relation between said specific tool and said specified product is cancelled, re-dispatching wafers into said specific tool in accordance with an antecedent rule that said specific tool is not assigned to process any specified product.

26. A system for dispatching wafers into tools, said system comprising:

means for determining a rank list of a plurality of wafers, wherein said rank list is determined by sorting a plurality of priorities of said wafers and each said wafer is corresponding to an individual priority, said priorities being automatically calculated with a plurality of system variables that are modified by a dispatcher;

means for receiving a limitation database which limits a plurality of relations between said wafers and a plurality of tools, wherein said limitation database comprises an exception rule and information that is used to identify each said wafer is belonged to a super hot run, a hot run, a rush run or a normal run, each of said tools being used to perform a specified process on said wafers and a process time is required to perform said specified process, wherein said limitation database is provided by said dispatcher; and means for automatically dispatching said wafers into a plurality of available tools in accordance with both said rank list and said limitation database, wherein said available tools are a portion of said tools.

27. The system according to claim 26, wherein a specified one of said wafers is processed by a specified one of said tools whenever said specified wafer has been located on said specified tool but has not been processed or said specified wafer is dedicated to said specified tool by said exception rule.

28. The system according to claim 26, wherein said automatically calculated priority is a summation of nine terms, said nine terms consisting of process time term, Q-Time term, waiting status term, commit due date term, output term, hot run priority, idle term, super hot run term and exception rule term.

29. The system according to claim 28, wherein said process time term reflects effect of the process time and the normal rule is that wafer with shorter process time product is presidential to be processed except said process time term is switched.

30. The system according to claim 28, wherein said Q-Time term reflects effect of the Q-time that is the period since a wafer has been waited to be processed, and the normal rule being that wafer with longer Q-Time is presidential to be processed except said Q-Time term is switched.

31. The system according to claim 28, wherein said waiting status term reflects whether a wafer is ready to be processed or not.

32. The system according to claim 28, wherein said commit due date term is increasing when the commit due date is approached and is more increasing when product is overdue.

33. The system according to claim 28, wherein said output term is increasing when the current output is lesser than the scheduled output and is decreasing when the current output is lager than the scheduled output.

34. The system according to claim 28, wherein said hot run term is active only when said wafer belong to said hot run.

35. The system according to claim 28, wherein said idle term is active only when said wafer has been located on said available tool but has not been processed.

36. The system according to claim 28, wherein said super hot run term is active only when said wafer belongs to said super hot run.

37. The system according to claim 28, wherein said exception rule is active only when at least one of said exception rule is assigned.

38. The system according to claim 26, wherein said priorities of said wafers are automatically recalculated per a specific duration that is assigned by said dispatcher.

39. The system according to claim 26, wherein said priorities are automatically recalculated whenever one of said wafers is processed by one of said tools.

40. The system according to claim 26, wherein said priorities are automatically recalculated whenever a new said wafer is appeared.

41. The system according to claim 26, wherein said priorities are automatically recalculated whenever said limitation database is modified.

42. The system according to claim 26, wherein said priorities are automatically recalculated whenever at least one of said system variables is modified.

43. The system according to claim 26, when a wafer that belongs to said super hot run is appeared, said wafer being dispatched into one of said available tools to cause a specific process to be processed on said wafer in accordance with these rules as following:

when said wafer is assigned to a specified tool by said exception rule and product of preceding process of said specified tool is equal to product of said wafer, then interrupts preceding process of said specified tool to process said wafer by said specified tool;

when said wafer is assigned to said specified tool and product of preceding process of said specified tool is not equal to product of said wafer, and when all required materials of said specific process are available, then interrupts preceding process of said specified tool to process said wafer by said specified tool;

when said wafer is assigned to said specified tool and product of preceding process of said specified tool is not equal to product of said wafer, and when required materials of said specific process are not all available, then sends a shortage warning message;

when said wafer is not assigned to any specified tool and an idle tool with enough required materials of said specific process is available, then said idle tool is used to process said wafer;

when said wafer is not assigned to any specified tool and an idle tool with enough required materials of said specific process is not available, and when at least one specific tool with same product as said wafer is available, then preceding process of a chose said specific tool that with lowest priority is interrupted to processed said wafer by said specific tool;

when said wafer is not assigned to any specified tool and no idle tool with enough required materials of the specific process is available, and when no tool with same product as the wafer is available and when required materials of the specific process are not all available, then sends said shortage warning message; and when said wafer is not assigned to any specified tool and no idle tool with enough required materials of the specific process is available, and when no tool with same product as said wafer is available but required materials of said specific process are available, then preceding process of a chose said available tool that with lowest priority is interrupted to processed the wafer.

44. The system according to claim 43, wherein said materials comprise probe-card when said available tools belong to test equipment.

45. The system according to claim 26, when a wafer that belongs to said hot run is appeared, said wafer being dispatched into one of said available tools to cause a specific process to be processed on said wafer in accordance with these rules as following:

when said wafer is assigned to a specified tool and product of preceding process of said specified tool is equal to product of said wafer, then processes said wafer by said specified tool when preceding process of said specified tool is finished;

when said wafer is assigned to said specified tool and product of preceding process of said specified tool is not equal to product of said wafer, and all required materials of said specific process are available, then processes said wafer by said specified tool when preceding process of said specified tool is finished;

when said wafer is assigned to said specified tool and product of preceding process of said specified tool is not equal to product of said wafer, and required materials of said specific process are not all available, then sends a shortage warning message;

when said wafer is not assigned to any specified tool and an idle tool with enough required materials of said specific process is available, then process said wafer by said idle tool;

when said wafer is not assigned to any specified tool and no idle tool with enough required materials of said specific process is available, and when at least one first specific tool with same product as said wafer is available and preceding processes of said first specific tool can be finished in a Q-Time duration is available, then process said wafer with a chose said first specific tool that with lowest priority when preceding process of said chose first specific tool is finished;

when said wafer is not assigned to any specified tool and no idle tool with enough required materials of said specific process is available, and when at least one second specific tool with same product as said wafer is available and no said second specific tool with preceding process that can not be finished in said Q-Time duration is available, then interrupts preceding process of a chose said second specific tool that with lowest priority to process said wafer;

when said wafer is not assigned to any specified tool and no idle tool with enough required materials of said specific process is available, and when no tool that fabricates same product as said wafer is available and when required materials of said specific process are not all available, then sends said shortage warning message;

when said wafer is not assigned to any specified tool and no idle tool with enough required materials of said specific process is available, and no said available tool with same product as said wafer is exist but all required materials of said specific process are available, and at least one third specific tool that preceding process can be finished in said Q-Time duration is available, then process said wafer by an earliest third specific tool that preceding process is finished earliest; and when said wafer is not assigned to any specified tool and no idle tool with enough required materials of said specific process is available, and no available tool with same product as said wafer is exist but all required materials of said specific process are available, and all said available tools can not finish preceding process in said Q-Time duration, then interrupt preceding process of a lowest available tool to process said wafer where said lowest available tool is one of said available tools that priority of product of preceding process is lowest.

46. The system according to claim 45, wherein said required materials comprise probe-card when said available tools belong to test equipment, and solution when available tools belong to wet etching equipment.

47. The system according to claim 26, when preceding process of a specific tool is finished and said specific tool can be used to process a succeeding process, one of said wafers that belongs to a normal run being dispatched into said specific tool in accordance with following rules:

when a specified product is assigned to be fabricated by said specific tool in accordance with said exception rule and when a plurality of first specific wafers with said specified product are available, and when product of said preceding process is equal to said specified product, then said specific tool is used to process some of said first specific wafers that with highest priority to fabricated said specified product;

when a specified product is assigned to be fabricated by said specific tool in accordance with said exception rule and when a plurality of second specific wafers with said specified product are available, and when product of said preceding process is not equal to said specified product but all required materials of said specific process are available, then said specific tool is used to process some of said second specific wafers that with highest priority to fabricate said specified product;

when a specified product is assigned to be fabricated by said specific tool in accordance with said exception rule and when a plurality of third specific wafers with said specified product are available, and when product of said preceding process is not equal to said specified product and required materials of said specific process are not all available, then sends a shortage warning message and the assignment relation between said specific tool and said specified product is cancelled;

when said specific tool is not assigned to process any specified product and scheduled output of product of said preceding process of said specific tool is not achieved, and a plurality of fourth specific wafers with same product as said preceding process are available, then said specific tool is used to process some of said fourth specific wafer that with highest priority;

when said specific tool is not assigned to process any specified product and scheduled output of product of said preceding process is not achieved, and no wafer with same product as said preceding process of said specific tool is available but a plurality of fifth specific wafers with both different products and sufficient required materials of said different products are available, then said specific tool is used to process some of said fifth specific wafers that with highest priority;

when said specific tool is not assigned to process any specified product and scheduled output of product of said preceding process is not achieved, and no wafer with same product as said preceding process is available and no wafer with different product and sufficient required materials of said different product is available, then said specific tool is idle and a wafer pull-in list is sent;

when said specific tool is not assigned to process any specified product and scheduled output of product of said preceding process is achieved, and when no wafer with product that scheduled output is not achieved is available and a plurality of sixth specific wafers with both same product as said preceding process and sufficient materials of product of said sixth specific wafers are available, then said specific tool is used to process part of said sixth specific wafers that with highest priority;

when said specific tool is not assigned to process any specified product and scheduled output of product of said preceding process is achieved, and when no wafer with product that scheduled output is not achieved is available and no wafer with same product as said preceding process is available, and when a plurality of seventh specific wafers that corresponding product is not equal to product of said preceding process are available and sufficient required materials of said seventh specific wafers are available, then said specific tool is used to process part of said seventh specific wafers that with highest priority;

when said specific tool is not assigned to process any specified product and scheduled output of product of said preceding process is achieved, and when no wafer with product that scheduled output is not achieved is available and no wafer with same product as said preceding process is available, and when no wafer with sufficient required materials is available, then said specific tool is idle and said wafer pull-in list is sent;

when said specific tool is not assigned to process any specified product and scheduled output of product of said preceding process is achieved, and when a plurality of eighth specific wafers with product that scheduled output is not achieved are available and required materials of said eighth specific wafers are available, then said specific tool is used to process some of said eighth wafers that with highest priority;

when said specific tool is not assigned to process any specified product and scheduled output of product of said preceding process is achieved, and when a plurality of ninth specific wafers with product that scheduled output are not achieved are available but required materials of said ninth specific wafers are not available, and when a plurality of tenth specific wafers with product that required materials are sufficient are available, then said specific tool is used to process part of said tenth specific wafers that with highest priority; and when said specific tool is not assigned to process any specified product and scheduled output of product of said preceding process is achieved, and when a plurality of eleventh specific wafers with product that scheduled output is not achieved are available but required materials of said eleventh specific wafers are not available, and also when no wafer with product that required materials is sufficient is available, then said specific tool is idle and said wafer pull-in list is sent.

48. The system according to claim 47, further comprising when said shortage warning message is sent, re-dispatching said wafers in accordance with a preferential rule that wafers with product that required materials are not all available are not dispatched until required materials are available.

49. The method according to claim 47, further comprising when the assignment relation between said specific tool and said specified product is cancelled, re-dispatching wafers into said specific tool in accordance with an antecedent that said specific tool is not assigned to process any specified product.

50. A system for processing numerous lots by some tools with automatic dispatch in a factory, said system comprising:

a plurality of tools that configured to perform a plurality of processes on a batch of said lots;

a lots bank that configured to store a plurality of lots; and a controller that coupled to said tools and said lots bank, wherein said controller is configured to automatically dispatch said lots into a plurality of available tools in accordance with a limitation database and a priority database, wherein said available tools are part of said tools, said limitation database being provided by a dispatcher and comprising a exception rule and information about each of said lots is belonged to a super hot run, a hot run, a rush run or a normal run, said priority database providing each said lot an individual priority that is automatically calculated before said lot is dispatched with a plurality of system variables that are adjustable.

51. The system according to claim 50, wherein said exception rule comprises information about which specified lot is assigned to be process by which specified tool.

52. The system according to claim 50, wherein said exception rule comprises information about which specified tool is assigned to fabricate a specific product, any lot with product as said specific product must be processed by said specified tool.

53. The system according to claim 50, wherein said system variables are modified by said dispatcher.

54. The system according to claim 50, wherein said priority is a summation of process time term, Q-Time term, waiting status term, commit due date term, output term, hot run priority, idle term, super hot run term and exception rule term.

55. The system according to claim 54, wherein said process time term reflects effect of the process time and the normal rule is that wafer with shorter process time product is presidential to be processed except said process time term is switched.

56. The system according to claim 54, wherein said Q-Time term reflects effect of the Q-time that is the period since a wafer has been waited to be processed, and the normal rule is that wafer with longer Q-Time is presidential to be processed except said Q-Time term is switched.

57. The system according to claim 54, wherein said waiting status term is used to reflect whether a wafer is ready or not.

58. The system according to claim 54, wherein said commit due date term is increasing when the commit due date is approached and is more increasing when product is overdue.

59. The system according to claim 54, wherein said output term is increasing when the current output is lesser than scheduled output and is decreasing when the current output is lager than scheduled output.

60. The system according to claim 54, wherein said hot run term is active only when wafer belong to said hot run.

61. The system according to claim 54, wherein said idle term is active only when wafer has been located on said available tool but has not been processed.

62. The system according to claim 54, wherein said super hot run term is active only when wafer belongs to said super hot run.

63. The system according to claim 54, wherein said exception rule is active only when at least one said exception rule is assigned.

64. The system according to claim 50, wherein conditions for automatically recalculating said priorities of said lots comprises a specific duration that is assigned by said dispatcher is arrived, one of said lots is processed by one of said tools, a new said lot is appeared, said limitation database is modified, and at least one of said system variables is modified.

65. The system according to claim 50, when a wafer that belongs to said super hot run is appeared, said wafer being dispatched into one of said available tools to cause a specific process is processed on said wafer in accordance with these rules as following:

when said wafer is assigned to a specified tool by said exception rule and product of preceding process of said specified tool is equal to product of said wafer, then interrupts preceding process of said specified tool to process said wafer by said specified tool;

when said wafer is assigned to said specified tool and product of preceding process of said specified tool is not equal to product of said wafer, and all when required materials of said specific process are available, then interrupts preceding process of said specified tool to process said wafer by said specified tool;

when said wafer is assigned to said specified tool and product of preceding process of said specified tool is not equal to product of said wafer, and when required materials of said specific process are not all available, then sends a shortage warning message;

when said wafer is not assigned to any specified tool and an idle tool with enough required materials of said specific process is available, then said idle tool is used to process said wafer;

when said wafer is not assigned to any specified tool and an idle tool with enough required materials of said specific process is not available, and when at least one specific tool with same product as said wafer is available, then preceding process of a chose said specific tool that with lowest priority is interrupted to processed said wafer by said specific tool;

when said wafer is not assigned to any specified tool and no idle tool with enough required materials of the specific process is available, and when no tool with same product as the wafer is available and when required materials of the specific process are not all available, then sends said shortage warning message; and when said wafer is not assigned to any specified tool and no idle tool with enough required materials of the specific process is available, and when no tool with same product as said wafer is available but required materials of said specific process are available, then preceding process of a chose said available tool that with lowest priority is interrupted to processed the wafer.

66. The system according to claim 50, when a wafer that belongs to said hot run is appeared, said wafer being dispatched into one of said available tools to cause a specific process to be processed on said wafer in accordance with these rules as following:

when said wafer is assigned to a specified tool and product of preceding process of said specified tool is equal to product of said wafer, then processes said wafer by said specified tool when preceding process of said specified tool is finished;

when said wafer is assigned to said specified tool and product of preceding process of said specified tool is not equal to product of said wafer, and all required materials of said specific process are available, then processes said wafer by said specified tool when preceding process of said specified tool is finished;

when said wafer is assigned to said specified tool and product of preceding process of said specified tool is not equal to product of said wafer, and required materials of said specific process are not all available, then sends a shortage warning message;

when said wafer is not assigned to any specified tool and an idle tool with enough required materials of said specific process is available, then process said wafer by said idle tool;

when said wafer is not assigned to any specified tool and no idle tool with enough required materials of said specific process is available, and when at least one first specific tool with same product as said wafer is available and preceding processes of said first specific tool can be finished in a Q-Time duration is available, then process said wafer with a chose said first specific tool that with lowest priority when preceding process of said chose first specific tool is finished;

when said wafer is not assigned to any specified tool and no idle tool with enough required materials of said specific process is available, and when at least one second specific tool with same product as said wafer is available and no said second specific tool with preceding process that can not be finished in said Q-Time duration is available, then interrupts preceding process of a chose said second specific tool that with lowest priority to process said wafer;

when said wafer is not assigned to any specified tool and no idle tool with enough required materials of said specific process is available, and when no tool that fabricates same product as said wafer is available and when required materials of said specific process are not all available, then sends said shortage warning message;

when said wafer is not assigned to any specified tool and no idle tool with enough required materials of said specific process is available, and no said available tool with same product as said wafer is exist but all required materials of said specific process are available, and at least one third specific tool that preceding process can be finished in said Q-Time duration is available, then process said wafer by an earliest third specific tool that preceding process is finished earliest; and when said wafer is not assigned to any specified tool and no idle tool with enough required materials of said specific process is available, and no available tool with same product as said wafer is exist but all required materials of said specific process are available, and all said available tools can not finish preceding process in said Q-Time duration, then interrupt preceding process of a lowest available tool to process said wafer where said lowest available tool is one of said available tools that priority of product of preceding process is lowest.

67. The system according to claim 50, when preceding process of a specific tool is finished and said specific tool can be used to process a succeeding process, one of said wafers that belongs to a normal run being dispatched into said specific tool in accordance with following rules:

when a specified product is assigned to be fabricated by said specific tool in accordance with said exception rule and when a plurality of first specific wafers with said specified product are available, and when product of said preceding process is equal to said specified product, then said specific tool is used to process some of said first specific wafers that with highest priority to fabricated said specified product;

when a specified product is assigned to be fabricated by said specific tool in accordance with said exception rule and when a plurality of second specific wafers with said specified product are available, and when product of said preceding process is not equal to said specified product but all required materials of said specific process are available, then said specific tool is used to process some of said second specific wafers that with highest priority to fabricate said specified product;

when a specified product is assigned to be fabricated by said specific tool in accordance with said exception rule and when a plurality of third specific wafers with said specified product are available, and when product of said preceding process is not equal to said specified product and required materials of said specific process are not all available, then sends a shortage warning message and the assignment relation between said specific tool and said specified product is cancelled;

when said specific tool is not assigned to process any specified product and scheduled output of product of said preceding process of said specific tool is not achieved, and a plurality of fourth specific wafers with same product as said preceding process are available, then said specific tool is used to process some of said fourth specific wafer that with highest priority;

when said specific tool is not assigned to process any specified product and scheduled output of product of said preceding process is not achieved, and no wafer with same product as said preceding process of said specific tool is available but a plurality of fifth specific wafers with both different products and sufficient required materials of said different is products are available, then said specific tool is used to process some of said fifth specific wafers that with highest priority;

when said specific tool is not assigned to process any specified product and scheduled output of product of said preceding process is not achieved, and no wafer with same product as said preceding process is available and no wafer with different product and sufficient required materials of said different product is available, then said specific tool is idle and a wafer pull-in list is sent;

when said specific tool is not assigned to process any specified product and scheduled output of product of said preceding process is achieved, and when no wafer with product that scheduled output is not achieved is available and a plurality of sixth specific wafers with both same product as said preceding process and sufficient materials of product of said sixth specific wafers are available, then said specific tool is used to process part of said sixth specific wafers that with highest priority;

when said specific tool is not assigned to process any specified product and scheduled output of product of said preceding process is achieved, and when no wafer with product that scheduled output is not achieved is available and no wafer with same product as said preceding process is available, and when a plurality of seventh specific wafers that corresponding product is not equal to product of said preceding process are available and sufficient required materials of said seventh specific wafers are available, then said specific tool is used to process part of said seventh specific wafers that with highest priority;

when said specific tool is not assigned to process any specified product and scheduled output of product of said preceding process is achieved, and when no wafer with product that scheduled output is not achieved is available and no wafer with same product as said preceding process is available, and when no wafer with sufficient required materials is available, then said specific tool is idle and said wafer pull-in list is sent;

when said specific tool is not assigned to process any specified product and scheduled output of product of said preceding process is achieved, and when a plurality of eighth specific wafers with product that scheduled output is not achieved are available and required materials of said eighth specific wafers are available, then said specific tool is used to process some of said eighth wafers that with highest priority;

when said specific tool is not assigned to process any specified product and scheduled output of product of said preceding process is achieved, and when a plurality of ninth specific wafers with product that scheduled output are not achieved are available but required materials of said ninth specific wafers are not available, and when a plurality of tenth specific wafers with product that required materials are sufficient are available, then said specific tool is used to process part of said tenth specific wafers that with highest priority; and when said specific tool is not assigned to process any specified product and scheduled output of product of said preceding process is achieved, and when a plurality of eleventh specific wafers with product that scheduled output is not achieved are available but required materials of said eleventh specific wafers are not available, and also when no wafer with product that required materials is sufficient is available, then said specific tool is idle and said wafer pull-in list is sent.

* * * * *